United States Patent
Al Jurdi et al.

(10) Patent No.: US 12,010,618 B2
(45) Date of Patent: Jun. 11, 2024

(54) APPARATUS AND METHOD FOR PROMOTING IN-DEVICE COEXISTENCE BETWEEN Wi-Fi AND ULTRA-WIDE BAND COMMUNICATION

(71) Applicant: Samsung Electronics Co., Ltd., Suwon-si (KR)

(72) Inventors: Rebal Al Jurdi, Allen, TX (US); Abhishek Sehgal, Plano, TX (US); Hao Chen, Plano, TX (US); Boon Loong Ng, Plano, TX (US); Yuming Zhu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/662,973

(22) Filed: May 11, 2022

(65) Prior Publication Data

US 2022/0369224 A1    Nov. 17, 2022

Related U.S. Application Data

(60) Provisional application No. 63/189,514, filed on May 17, 2021.

(51) Int. Cl.
*H04W 52/02* (2009.01)
*H04B 1/7163* (2011.01)

(52) U.S. Cl.
CPC ...... *H04W 52/0216* (2013.01); *H04B 1/7163* (2013.01)

(58) Field of Classification Search
CPC ............ H04W 52/0216; H04B 1/7163; H04B 1/71632; H04B 2201/71634; H04B 1/719; Y02D 30/70
See application file for complete search history.

(56) References Cited

U.S. PATENT DOCUMENTS

| 7,599,686 B2 | 10/2009 | Quinn et al. |
| 10,149,209 B2 | 12/2018 | Lepp et al. |

(Continued)

OTHER PUBLICATIONS

Q. Chen and Y. -H. Zhu, "Scheduling Channel Access Based on Target Wake Time Mechanism in 802.11ax WLANs," in IEEE Transactions on Wireless Communications, vol. 20, No. 3, pp. 1529-1543, Mar. 2021, doi: 10.1109/TWC.2020.3034173. (Year: 2021).*

*Primary Examiner* — Sam K Ahn
*Assistant Examiner* — Amneet Singh

(57) ABSTRACT

A method includes determining one or more active slots and inactive slots in an ultra-wide band (UWB) ranging round. The method also includes determining multiple silent periods in the ranging round based on an arrangement of the inactive slots. The method also includes determining a target silent period in the ranging round, among the multiple silent periods, to be used for WiFi communication. The method also includes determining multiple target wake time (TWT) parameters such that a TWT session period defined by the TWT parameters overlaps with the target silent period. The method also includes determining one or more second silent periods preceding the target silent period in which the TWT parameters can be negotiated with an access point (AP) for the WiFi communication. The method also includes negotiating the TWT parameters with the AP during the one or more second silent periods.

20 Claims, 14 Drawing Sheets

(56) References Cited

U.S. PATENT DOCUMENTS

2017/0019853 A1   1/2017  Ghosh et al.
2017/0064633 A1   3/2017  Jia et al.
2022/0295483 A1*  9/2022  Jain ...................... H04W 4/029

* cited by examiner

APPARATUS AND METHOD FOR PROMOTING IN-DEVICE COEXISTENCE BETWEEN Wi-Fi AND ULTRA-WIDE BAND COMMUNICATION

CROSS-REFERENCE TO RELATED APPLICATIONS AND CLAIM OF PRIORITY

The present application claims priority to U.S. Provisional Patent Application No. 63/189,514, filed on May 17, 2021. The content of the above-identified patent document is incorporated herein by reference.

TECHNICAL FIELD

The present disclosure relates generally to wireless communication systems and, more specifically, the present disclosure relates to a system and method for promoting in-device coexistence between Wi-Fi and ultra-wide band communication.

BACKGROUND

Ultra-Wide Band (UWB) is a wireless technology recently added to mobile devices that enables not only data-sharing applications, but also many other use cases such as indoor positioning and navigation. Recently, the Wi-Fi Alliance has started granting Wi-Fi 6 certification to devices implementing the IEEE 802.11ax amendment, which enhances throughput and efficiency in congested environments, and device vendors have been rapidly seeking this certification. The certification program extends to devices capable of operating in the 6 GHz band for bandwidth-intensive applications via the Wi-Fi 6E certification. With some UWB channels spanning the 6 GHz band, which is also used by Wi-Fi-6E-certified devices, the two systems, Wi-Fi and UWB, are at risk of interference from one another.

SUMMARY

The present disclosure relates to wireless communication systems and, more specifically, to a system and method for promoting in-device coexistence between Wi-Fi and ultra-wide band communication.

In one embodiment, a method includes determining one or more active slots and inactive slots in an ultra-wide band (UWB) ranging round. The method also includes determining multiple silent periods in the ranging round based on an arrangement of the inactive slots. The method also includes determining a target silent period in the ranging round, among the multiple silent periods, to be used for WiFi communication. The method also includes determining multiple target wake time (TWT) parameters such that a TWT session period defined by the TWT parameters overlaps with the target silent period. The method also includes determining one or more second silent periods preceding the target silent period in which the TWT parameters can be negotiated with an access point (AP) for the WiFi communication. The method also includes negotiating the TWT parameters with the AP during the one or more second silent periods.

In another embodiment, a device includes a memory configured to store instructions. The device also includes a processor operably connected to the memory. The processor is configured when executing the instructions to: determine one or more active slots and inactive slots in an UWB ranging round; determine multiple silent periods in the ranging round based on an arrangement of the inactive slots; determine a target silent period in the ranging round, among the multiple silent periods, to be used for WiFi communication; determine multiple TWT parameters such that a TWT session period defined by the TWT parameters overlaps with the target silent period; determine one or more second silent periods preceding the target silent period in which the TWT parameters can be negotiated with an AP for the WiFi communication; and negotiate the TWT parameters with the AP during the one or more second silent periods.

In yet another embodiment, a non-transitory computer readable medium includes a plurality of instructions. The plurality of instructions, when executed by at least one processor, is configured to cause the at least one processor to: determine one or more active slots and inactive slots in an UWB ranging round; determine multiple silent periods in the ranging round based on an arrangement of the inactive slots; determine a target silent period in the ranging round, among the multiple silent periods, to be used for WiFi communication; determine multiple TWT parameters such that a TWT session period defined by the TWT parameters overlaps with the target silent period; determine one or more second silent periods preceding the target silent period in which the TWT parameters can be negotiated with an AP for the WiFi communication; and negotiate the TWT parameters with the AP during the one or more second silent periods.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes.

Figure 1:
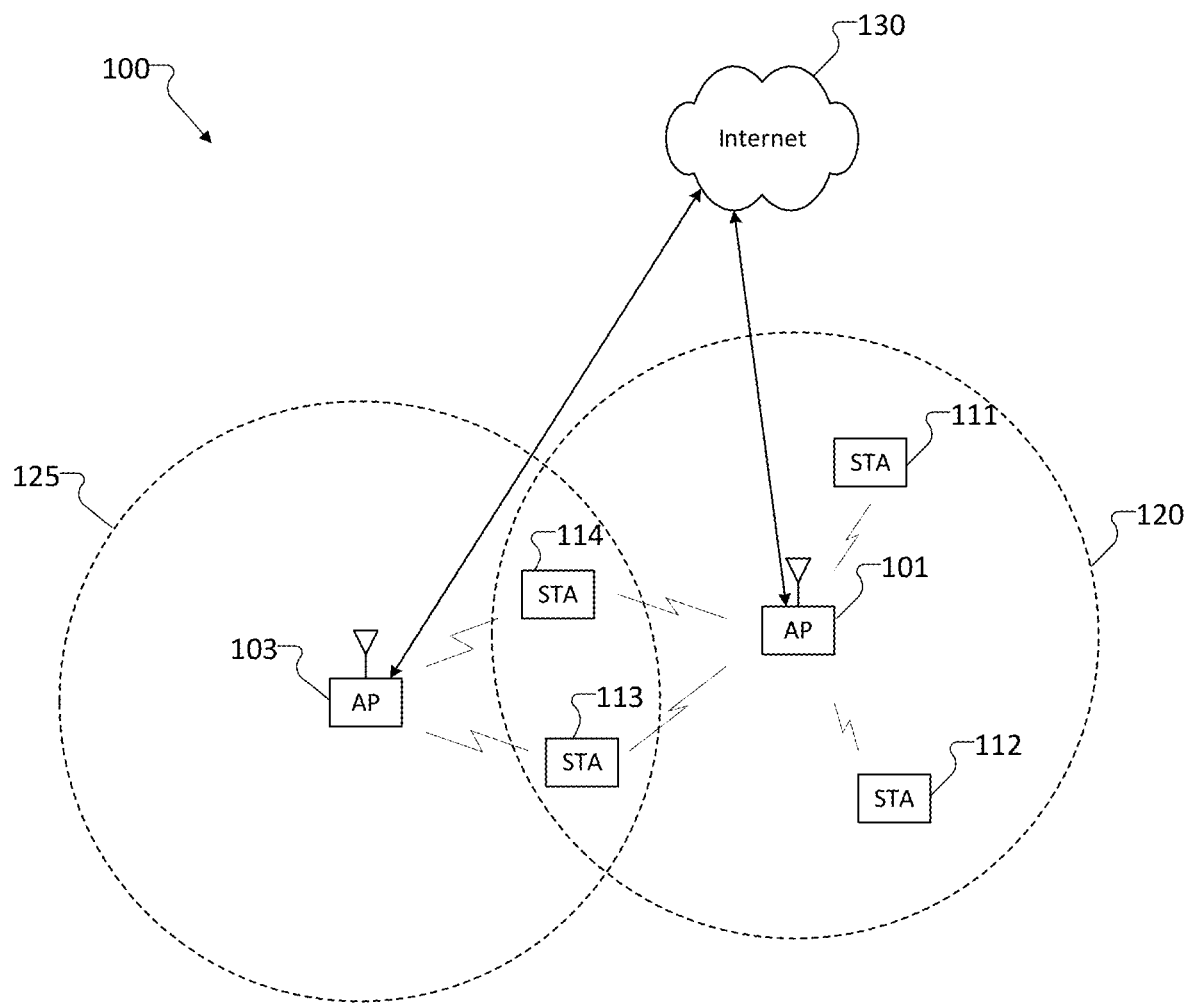
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for promoting in-device coexistence between Wi-Fi and ultra-wide band communication. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
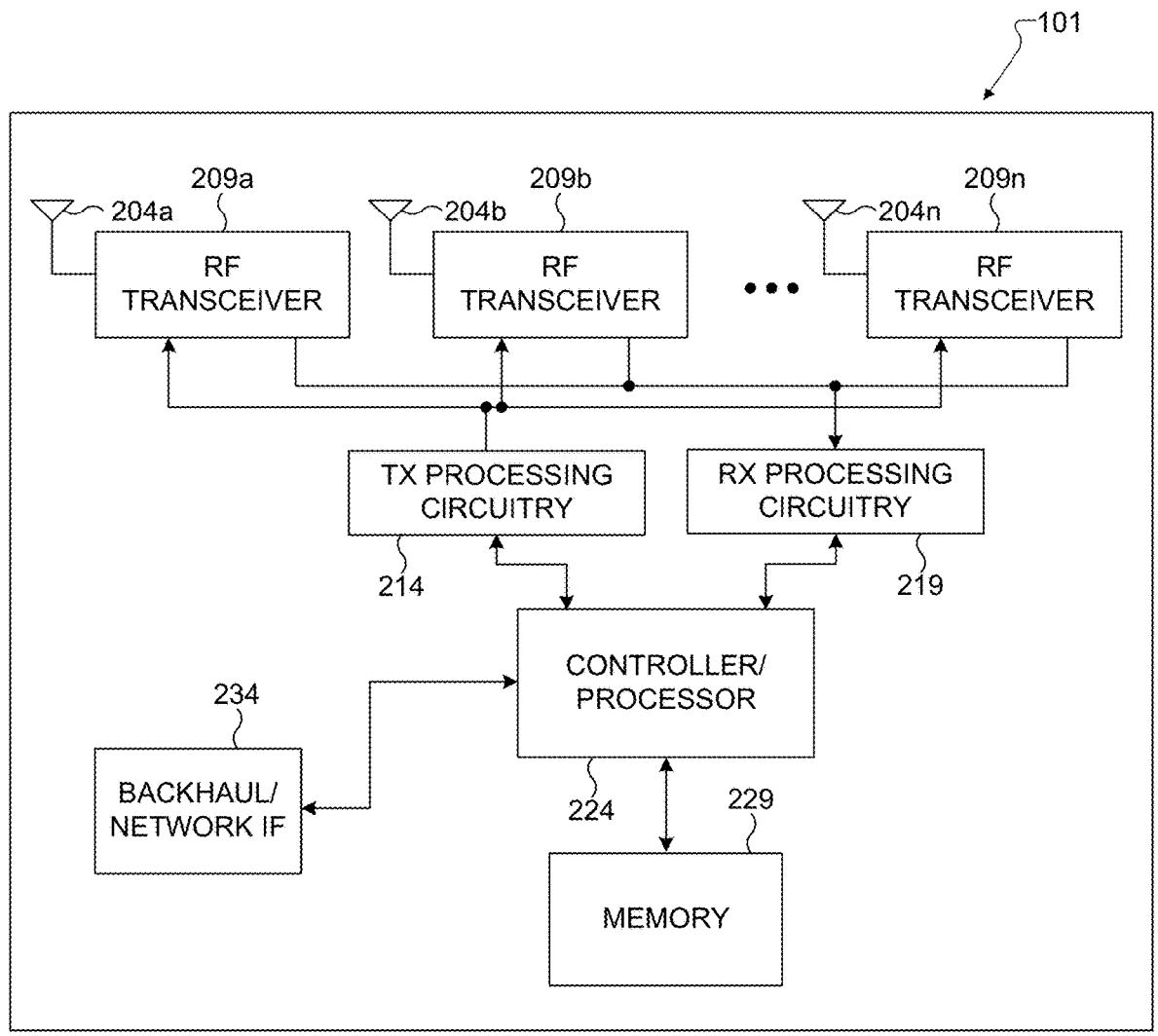
FIG. 2A illustrates an example AP according to embodiments of the present disclosure.

FIG. 2A illustrates an example AP 101 according to embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including promoting in-device coexistence between Wi-Fi and ultra-wide band communication. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for promoting in-device coexistence between Wi-Fi and ultra-wide band communication. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
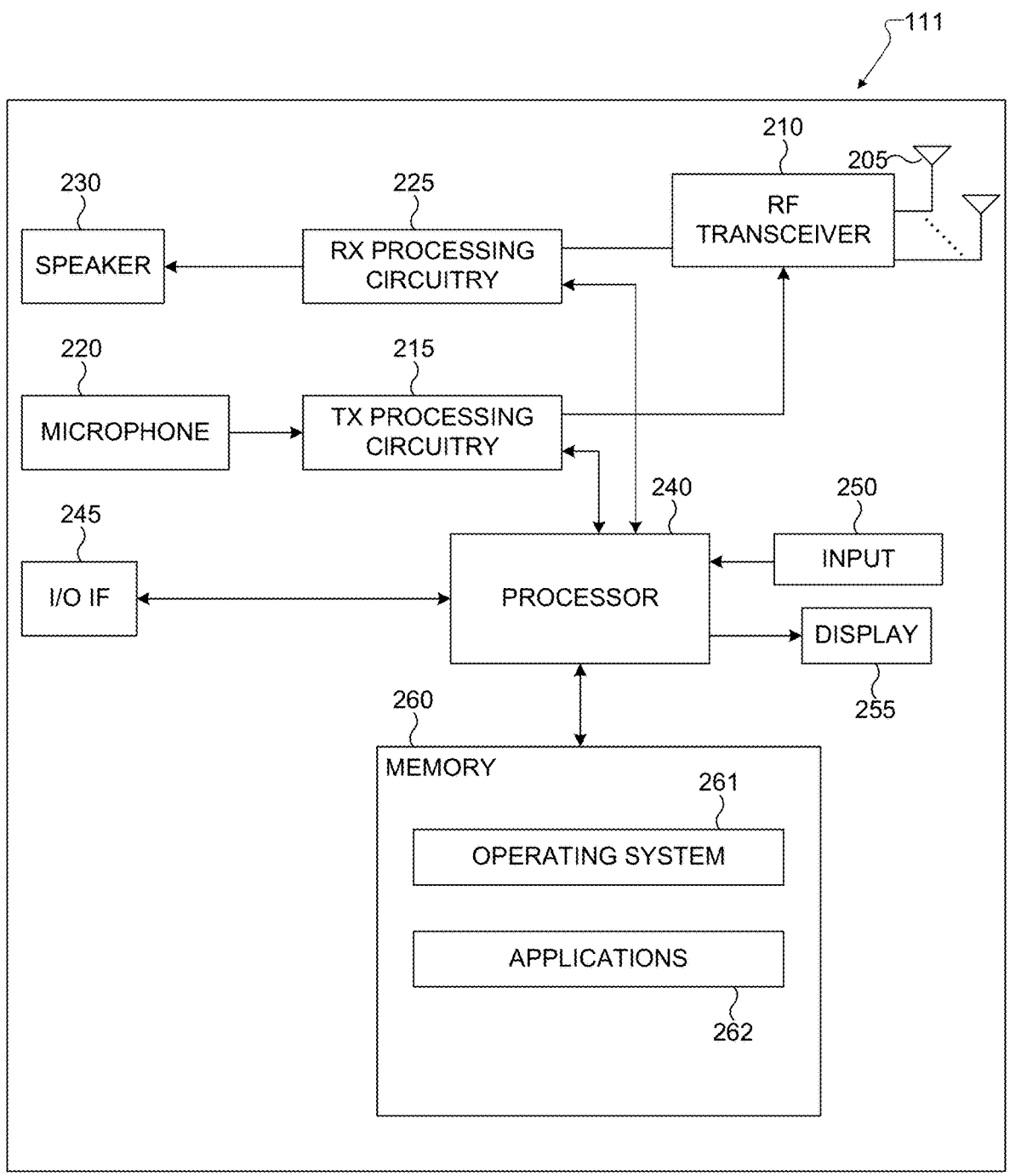
FIG. 2B illustrates an example STA according to embodiments of this disclosure.

FIG. 2B illustrates an example STA 111 according to embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured for promoting in-device coexistence between Wi-Fi and ultra-wide band communication. In some embodiments, the controller/processor 240 includes at least one microprocessor or microcontroller.

The controller/processor 240 can move data into or out of the memory 260 as required by an executing process. In some embodiments, the controller/processor 240 is configured to execute a plurality of applications 262, such as applications for promoting in-device coexistence between Wi-Fi and ultra-wide band communication. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

UWB is a wireless technology that enables positioning and proximity applications. Specifically, the 802.15.4z amendment to the IEEE Standard for Low-Rate Wireless Networks defines UWB ranging techniques and ranging modes of operation that standardize the computation and communication of key physical quantities, such as round-trip time between two ranging capable devices (RDEVs), time of flight, and two- or three-dimensional angle of arrival.

Figure 3:
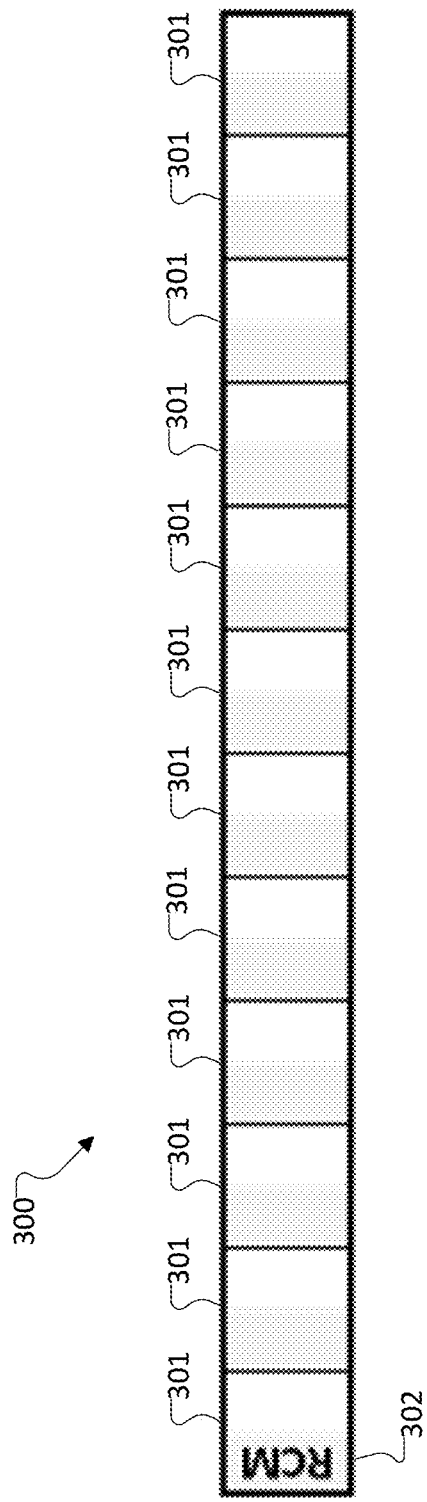
FIGS. 3 and 4 illustrate examples of ranging rounds according to the block-based ranging mode.
Figure 4:
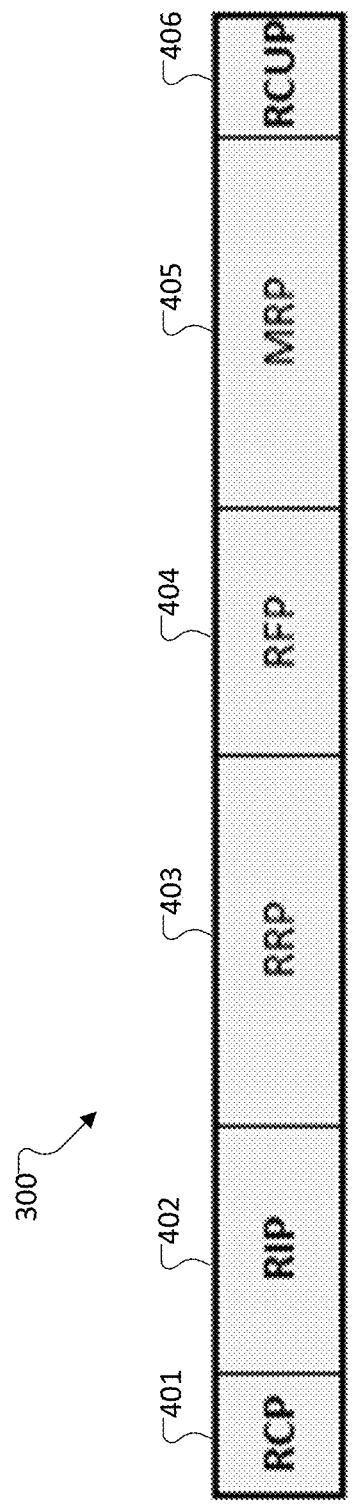

FIGS. 3 and 4 illustrate examples of ranging rounds according to one ranging mode, the block-based mode. The ranging timeline according to the block-based mode operates according to the following timeline as defined in 802.15.14z: ranging blocks contain multiple ranging rounds (back-to-back), where each ranging round further contains multiple ranging slots. For example, FIG. 3 shows a ranging round 300 that includes twelve ranging slots 301. The duration of a ranging slot 301 can be, e.g., 0.5 ms, 1 ms, 2 ms, 5 ms, or the like. Each ranging round 300 starts with a Ranging Control Message (RCM) 302, which contains control information for the current and possible subsequent ranging rounds. As shown in FIG. 4, a ranging round 300 is split into the following phases, in chronological order: Ranging Control Phase (RCP) 401, Ranging Initiation Phase (RIP) 402, Ranging Response Phase (RRP) 403, optional Ranging Final Phase (RFP) 404, optional Measurement Report Phase (MRP) 405, and optional Ranging Control Update Phase (RCUP) 406. In the RCP 401, the controller sends the RCM 302 to the participant devices. In the RIP 402, the initiator sends out initiation ranging. In the RRP 403, responders each perform ranging in response to initiation. In the (optional) RFP 404, the initiator follows up with a second and final ranging. In the (optional) MRP 405, responders communicate measurements (e.g., ToF, AoA, and the like) to the initiator. In the RCUP 406, the controller sends a Ranging Control Update Message (RCUM), which is to update the round structure for the next rounds. The control information that is sent in the RCM 302 and RCUM is enclosed inside Information Elements (IEs) and embedded in the MAC payload.

An active slot is defined as a ranging slot where a device is expected to be active, i.e., actively transmitting or receiving. The following types of ranging slots are considered active slots:

Slots where the RCM and RCUM are transmitted by the controller.
Slots where an initiator performs ranging.
Slots where an initiator performs follow-up ranging.
Slots where the RDEV performs ranging, regardless of whether the RDEV is an initiator or a responder.
Slots where the RDEV sends measurement reports.
Slots containing transmission from any participant, be it ranging or data communication, that the RDEV has an interest in listening to.

The following IEs, among others, determine the location of active slots over the horizon of at least the ranging round in which they are first defined, and potentially for subsequent ranging rounds and ranging blocks as well:

Advanced Ranging Control IE (ARC IE): Carried by the RCM. The ARC IE provides the duration of ranging slots, the number of ranging slots in a ranging round, and the number of ranging rounds in a ranging block. The ARC IE also specifies whether there is an MRP. The ARC IE also determines the number of rounds that control information provided by the RCM is valid for.
Ranging Contention Phase Structure IE (RCPS IE): Carried by the RCM when the ARC IE indicates that contention-based ranging is used. The RCPS IE specifies the start/stop ranging slot delimiters of the RIP, RRP, and MRP.
Ranging Device Management IE (RDM IE): Carried by the RCM. The RDM IE assigns to every participating device a ranging role (e.g., initiator or responder), and allots ranging slots to range or report measurements.
Ranging Round IE (RR IE): Carried by the RCM or the RCUM. The RR IE indicates whether the MAC frame should be transmitted at an offset from the edge of the ranging slot. The RR IE also tracks the index of ranging blocks and rounds.

Ranging Block Update IE (RBU IE): Carried by the RCM or the RCUM to signal whether a new ranging configuration is being used, i.e., to update the sizes of the ranging block, round and slot. The RBU IE also signals the number of remaining blocks with the existing structure before switching to a new structure.

Figure 5:
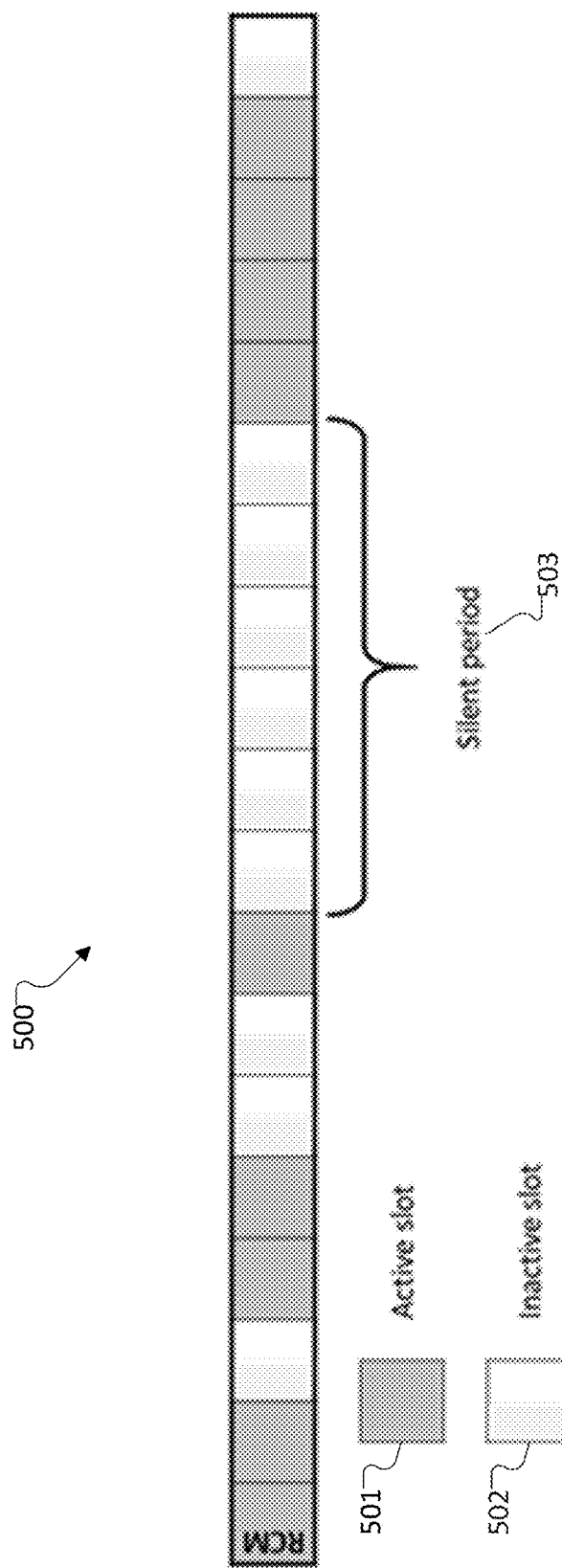
FIG. 5 illustrates an example ranging round that includes active slots, inactive slots, and a silent period.

In addition to the in-band control information sent to the participants by the controller through the RCM and RCUM, out-of-band (OOB) information exchanged by the controller and controlee applications prior to the ranging event is typically important in determining active slots in any given ranging round. FIG. 5 illustrates an example ranging round 500 that includes active slots 501 (which are ranging slots where the device is expecting to range, measure, or report), inactive slots 502, and a silent period 503, which is a group of contiguous inactive slots 502. The presence of swaths of inactive slots 502 inside ranging rounds and their predetermined location provides a natural environment for coexistence between IEEE 802.11 Wireless Local Area Networks (WLAN) and UWB via time-division-multiplexing (TDM). Given the location and duration of inactive slots 502, WLAN can adhere to a sleep-wake schedule so that its activity can be aligned with the idleness of UWB.

Target Wake Time

Figure 6:
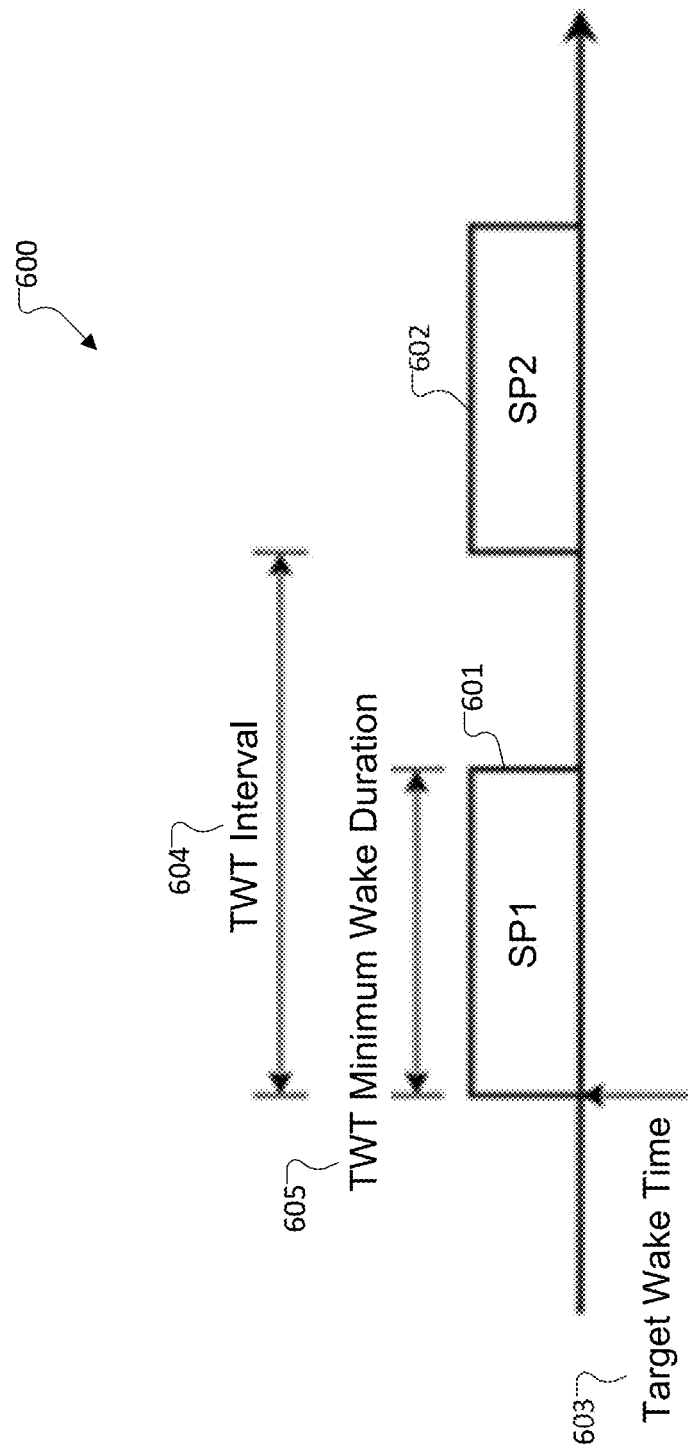
FIG. 6 illustrates an example Target Wake Time (TWT) session.

WLAN defines a mechanism to mitigate channel contention and promote coexistence in dense WLAN scenarios and deterministic behavior. This mechanism is known as Target Wake Time (TWT). Using TWT, every WLAN station (STA) negotiates with the access point (AP) periods in which the STA is awake to transmit and receive packets. These periods are known as the TWT Session or the Session Period (SP). FIG. 6 illustrates an example TWT session 600 that includes session periods SP1 601 and SP2 602. Outside the session periods 601 and 602, the device remains asleep. The wake schedule is defined by a set of parameters, referred to as TWT parameters. As shown in FIG. 6, the parameters include the following:

Target Wake Time 603: The next time the STA should wake up.

TWT Interval 604: The time interval between adjacent session periods.

TWT Minimum Wake Duration 605: The minimum duration the STA stays awake.

The negotiation happens via at least one exchange of request/response messages between the STA and AP as follows. The STA sends a request message to the AP containing its desired set of TWT parameters. The AP sends back a response message approving or rejecting these parameters. If the STA does not get an approval of the desired TWT parameters, the STA can enter subsequent exchanges to renegotiate. Once the negotiation completes, the STA goes to sleep and does not wake up until the Target Wake Time 603, stays awake for the SP with length specified by the TWT Minimum Wake Duration 605, and then goes back to sleep. During the SP, the STA can send and receive data.

Wi-Fi 6E and UWB Channels 5-7 occupy parts of the 6-GHz band. While Wi-Fi and WLAN are used for data applications, UWB (IEEE 802.15.4z) is used for ranging applications, and these two application classes can be operating simultaneously on a device. Significant levels of interference can be seen at the physical layers of WLAN and UWB when both systems are operating simultaneously. Favorable coexistence of these two systems on the same device (i.e., in-device coexistence) is desired to ensure good performance on both fronts: acceptable throughput, latency, among other network-related indicators for WLAN, and acceptable ranging latency for UWB.

To address these and other issues, this disclosure provides a system and method for promoting in-device coexistence between Wi-Fi and UWB communication in the time domain. As described in more detail below, the disclosed embodiments include a coordinator that determines periods of UWB inactivity to enable WLAN operation therein by using the TWT power saving mechanism. In some embodiments, the coordinator determines from UWB in-band control information and out-of-band information the ranging timeline of the UWB ranging device (RDEV). Then, the coordinator deduces the silent periods corresponding to UWB inactivity. The coordinator computes the TWT parameters to align the TWT session period with an appropriate UWB silent period and asks the STA to negotiate said parameters with the WLAN AP in one or more preceding silent periods. When TWT parameter negotiation fails in the one or more preceding silent periods, the TWT parameters can be negotiated in the current selected silent period so that the TWT SP occurs in a selected silent period of the next UWB ranging block.

Note that while some of the embodiments discussed below are described in the context of use in consumer electronic devices, such as smartphones or tablet computers, these are merely examples. It will be understood that the principles of this disclosure may be implemented in any number of other suitable devices or contexts.

Figure 7:
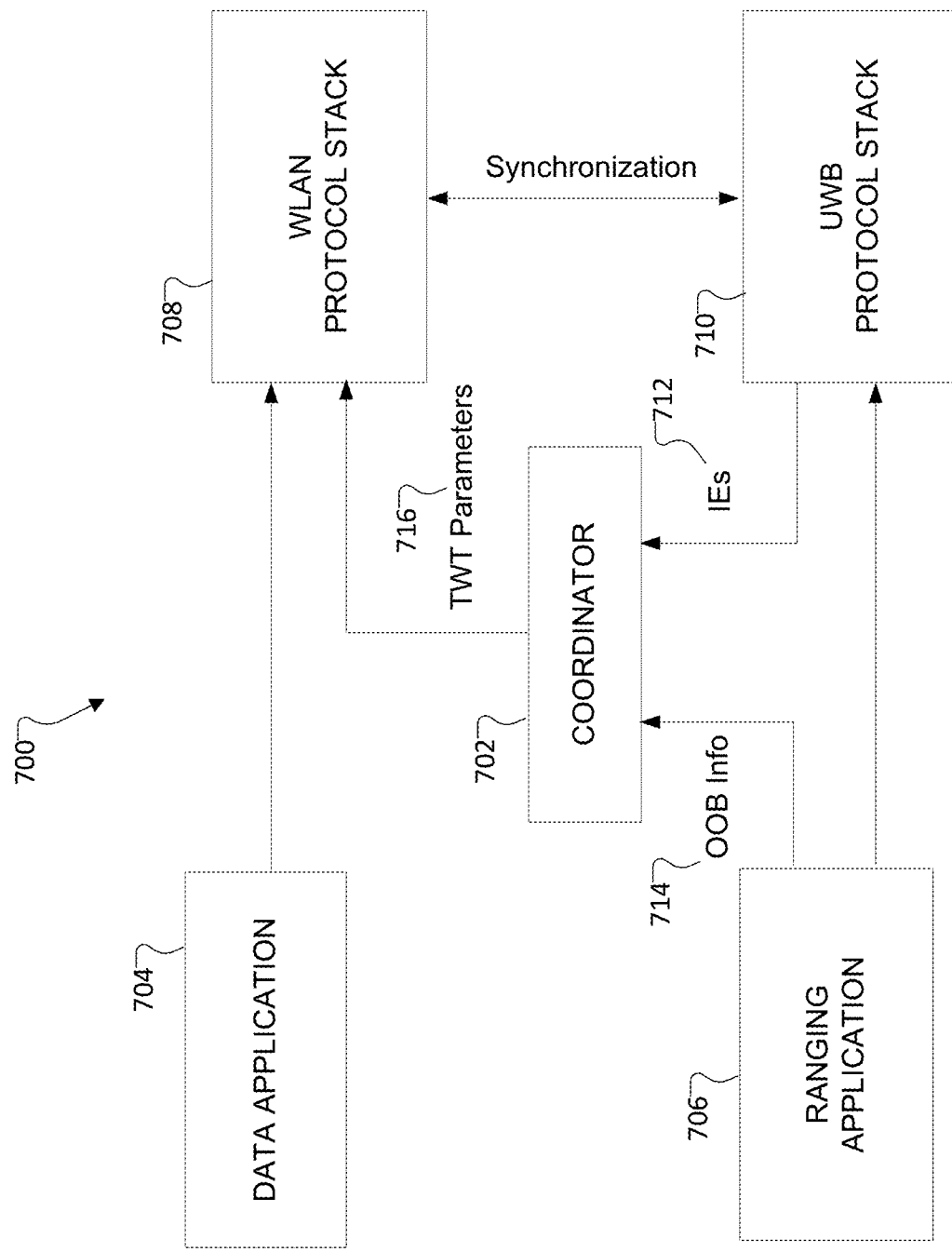
FIG. 7 illustrates an example framework for promoting in-device coexistence between Wi-Fi and UWB communication in the time domain according to embodiments of the present disclosure.

FIG. 7 illustrates an example framework 700 for promoting in-device coexistence between Wi-Fi and UWB communication in the time domain according to embodiments of the present disclosure. The embodiment of the framework 700 shown in FIG. 7 is for illustration only. Other embodiments of the framework 700 could be used without departing from the scope of this disclosure. For ease of explanation, the framework 700 will be described as being implemented in the STA 111 of FIG. 1. However, the framework 700 could be implemented in any other suitable device.

As shown in FIG. 7, the framework 700 includes a coordinator 702, a data application 704, and a ranging application 706. The STA 111 can execute both applications 704, 706 simultaneously without affecting performance. The data application 704 uses the WLAN protocol stack 708 of the STA 111, and the ranging application 706 uses the UWB protocol stack 710 of the STA 111. In some embodiments, the data application 704 can include, e.g., a video/voice call, audio streaming, file upload/download, or any real-time or non-real-time data application. The ranging application 706 can be a proximity or positioning application that shows the user navigating indoors (e.g., at a shopping mall, airport, or the like). Of course, these are merely examples, and the data application 704 and the ranging application 706 can represent any suitable applications executing on the STA 111.

The coordinator 702 manages the in-device coexistence of the WLAN communication by the data application 704 and the UWB communication by the ranging application 706 by coordinating their activity. The coordinator 702 could be implemented in the STA 111 as hardware, software, firmware, or any combination of these. In general, WLAN can coexist with UWB on the same device by going active in any of the following time or frequency domains:

(1) Before a ranging event starts (and completing the WLAN transceiving before the ranging event starts)

and/or after the ranging event completes (and completing the WLAN transceiving before the next ranging event starts).

(2) Using another WLAN band (e.g., 2.4/5 GHz) that does not overlap in frequency with frequency bands in which UWB operates.

(3) Within a UWB ranging round (e.g., using the inactive slots within the UWB ranging round).

(4) Between ranging rounds, sets of rounds, and ranging blocks when the interval-based mode of ranging is used, as discussed in greater detail below.

In some embodiments, the coordinator 702 coordinates activity between the data application 704 (WLAN) and the ranging application 706 (UWB) within a UWB ranging round. The coordinator 702 can obtain control information to determine a timeline for the ranging session in a future time period. In some embodiments, the coordinator 702 can read the control messages within a ranging round (e.g., the RCM, the RCUM, and the like) and extract relevant control information (e.g., IEs 712) from the UWB protocol stack 710. The coordinator 702 can also obtain OOB information 714 (i.e., other information obtained through a back channel, such as a BLUETOOTH channel) exchanged before the start of the first ranging round. The OOB information 714 can supplement the in-band information (obtained from the RCM and RCUM) in drawing the ranging timeline.

After getting this information, the coordinator 702 deduces all active slots (e.g., the active slots 501), as well as inactive slots (e.g., the inactive slots 502). The coordinator 702 groups the contiguous inactive slots into UWB silent periods (e.g., the silent period 503), with each silent period consisting of a group of contiguous inactive UWB slots. In some embodiments, the coordinator 702 activates the WLAN transceiver during UWB silent periods. In other embodiments, the coordinator 702 uses the TWT mechanism and determines a set of TWT parameters 716 to align the TWT SP with a UWB silent period. Such a silent period, in one example, can be long enough at least for WLAN to wake up from sleep and then go back to sleep. Stated differently, in this example, the SP occurs during the UWB silent period.

Figure 8:
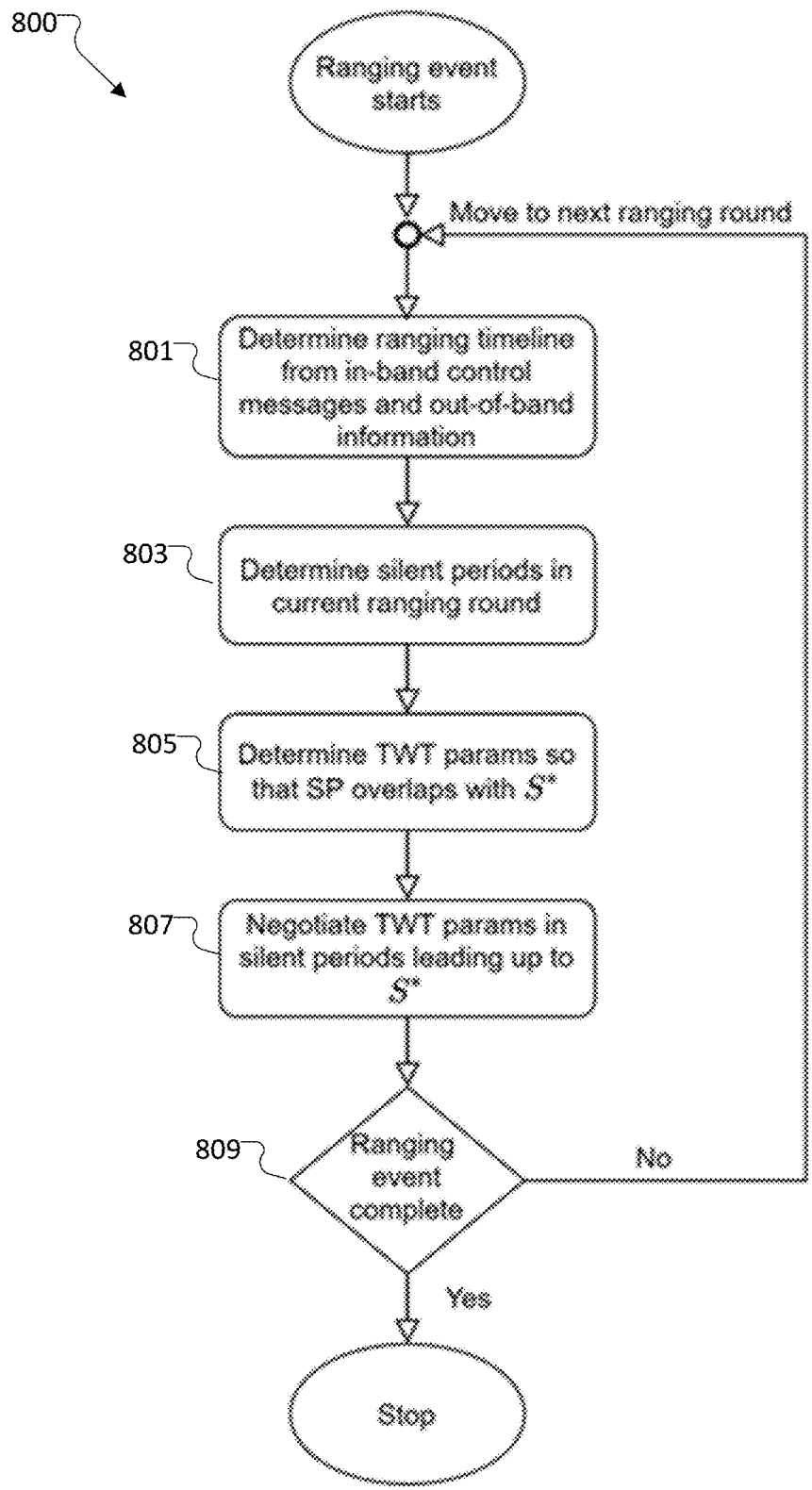
FIGS. 8, 9A, and 9B illustrate details of example processes for promoting in-device coexistence between Wi-Fi and UWB communication in the time domain according to embodiments of the present disclosure.

FIG. 8 illustrates details of an example process 800 for promoting in-device coexistence between Wi-Fi and UWB communication in the time domain according to embodiments of the present disclosure. For ease of explanation, the process 800 will be described as being performed by the coordinator 702 (as implemented within the STA 111) using the framework 700. The embodiment of the process 800 shown in FIG. 8 is for illustration only. Other embodiments of the process 800 could be used without departing from the scope of this disclosure.

As shown in FIG. 8, at operation 801, the coordinator 702 determines a ranging timeline from the in-band control messages and the OOB information 714. In some embodiments, the coordinator 702 obtains the relevant IEs 712 located inside the RCM, which is present in the first ranging slot of the first ranging round of the first ranging block. This can occur regardless of whether the RDEV assumes the position of the controller (generates control information, e.g., the RCM) or that of the controlee (receives and abides by control information).

The coordinator 702 couples the preceding in-band information with the OOB information 714. In some embodiments, the OOB information 714 can include setup parameters (e.g., number of participants, ranging roles, and the like) that are negotiated between the ranging participants at the app level and communicated, for example, via BLUETOOTH or WiFi. The setup parameters can include any of the parameters carried inside the RCM. Such parameters can be negotiated OOB, and then carried inside the RCM. Alternatively, the parameters can be negotiated OOB, and not carried inside the RCM. Specific examples of OOB information 714 can include device type, device role, multi-node mode, number of controlees, source MAC address, destination MAC address, MAC address mode, ranging method, ranging interval, slots per RR, slot duration, ranging time structure, scheduled mode, UWB initiation time, ranging round hopping, maximum contention phase length, contention phase update length, session priority, maximum number of RR retries, MAC configuration, MAC type, responder slot index, in-band termination attempt count, STS configuration, number of STS segments, vendor ID, static STS IV, STS index, key rotation, key rotation rate, AoA result request, ranging data NTF (near), ranging data NTF (far), blink random interval, authenticity tag, and the like.

The coordinator 702 uses this information to determine, as far into the future as it is able to foresee, the ranging timeline, which involves two components: (i) structure (i.e., the number of ranging blocks per ranging events, rounds per block, slots per round, and the like) and (ii) schedule (i.e., the location of potential ranging slots allotted to every participating device for ranging and data exchange).

At operation 803, the coordinator 702 accounts for all active slots (e.g., the active slots 501) in the current ranging round. The coordinator 702 also deduces inactive slots (e.g., the inactive slots 502) as all ranging slots in the ranging round obtained by extracting out the active slots. The coordinator 702 then examines the pattern of inactive slots in the ranging round and determines the location and duration of one or more silent periods (e.g., the silent period 503) in the ranging round. As discussed above, each silent period comprises a group of contiguous inactive slots.

At operation 805, the coordinator 702 determines a target silent period S* (e.g., the longest silent period) to be used for WLAN operation. The coordinator 702 then determines one or more TWT parameters so that the TWT SP overlaps with the target silent period (i.e., the WLAN wakes up at the start of the target silent period and remains awake for its duration). The TWT parameters determined by the coordinator 702 can include, e.g., the Target Wake Time 603, the TWT interval 604, the TWT Minimum Wake Duration 605, or any combination of these.

At operation 807, the coordinator 702 determines a sequence of preceding silent periods, which lead to the silent period S* dedicated for WLAN operation, for negotiating the TWT parameters with the AP. The coordinator 702 also reads the RCUM at the end of the current ranging round (if available) and the RCM at the start of the following ranging round, extracts relevant IEs, and updates the ranging structure if needed. Based on the ranging structure, the coordinator 702 determines the silent periods, the TWT parameters to align the TWT SP with one of the silent periods, and the silent periods for negotiating these parameters.

At operation 809, the coordinator 702 determines if the ranging event is complete. If the ranging event is not complete, then the coordinator 702 moves to the next ranging round and repeats the sequence of action until the ranging event completes.

Although FIG. 8 illustrates one example of a process 800 for promoting in-device coexistence between Wi-Fi and UWB communication in the time domain, various changes may be made to FIG. 8. For example, while shown as a series of steps, various steps in FIG. 8 could overlap, occur in parallel, occur in a different order, or occur any number of times.

Figure 9A:
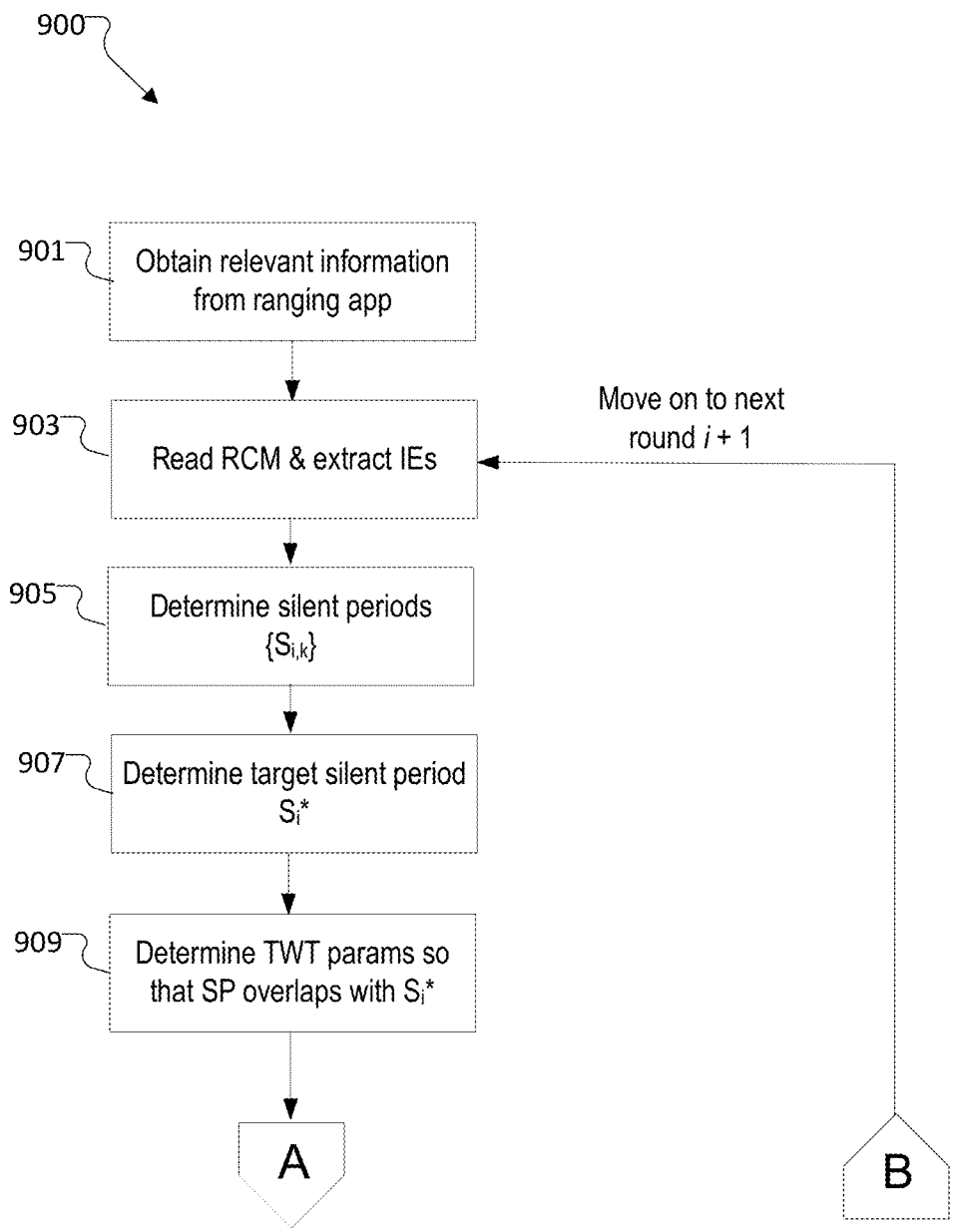
Figure 9B:
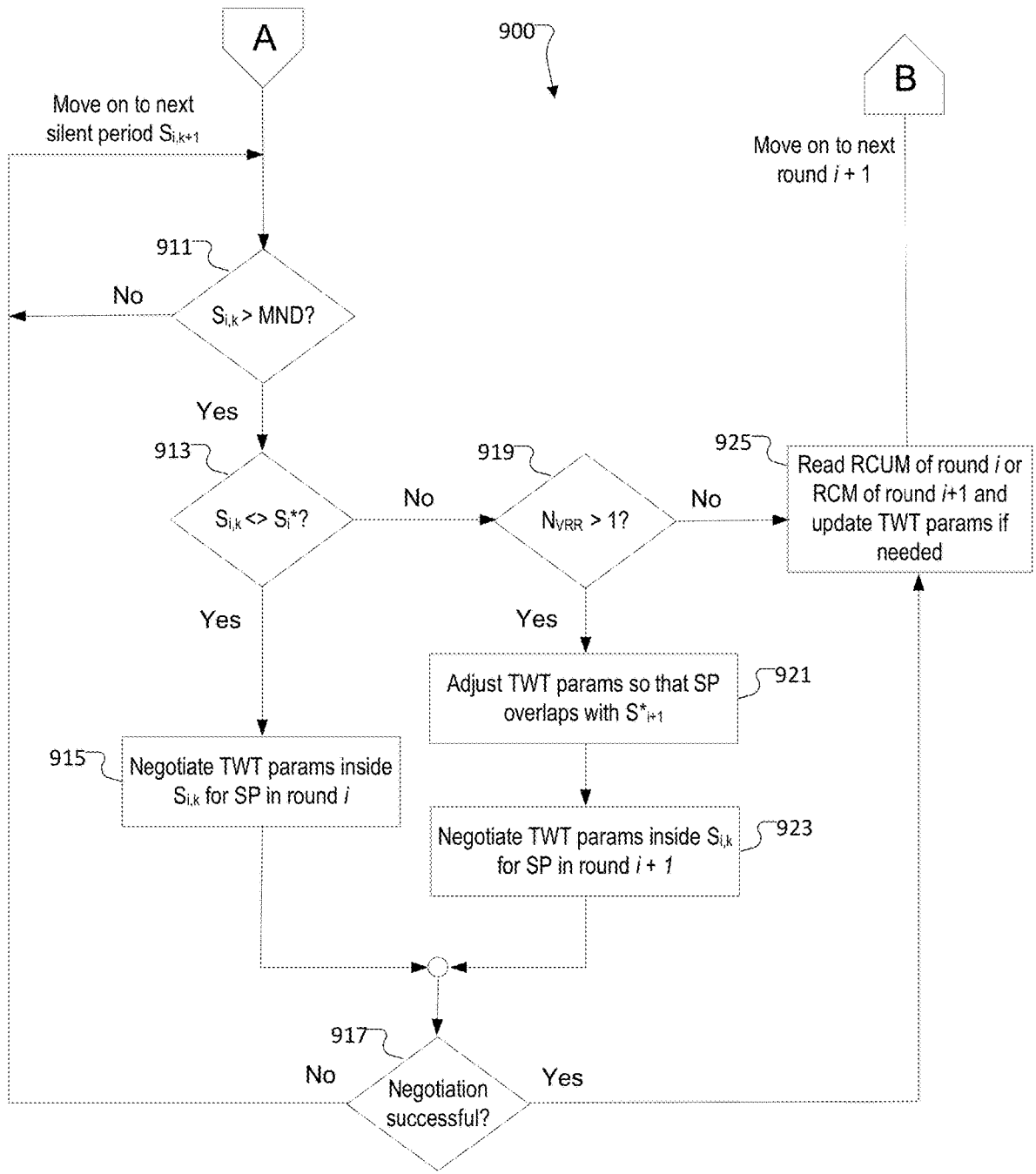
Figure 10:
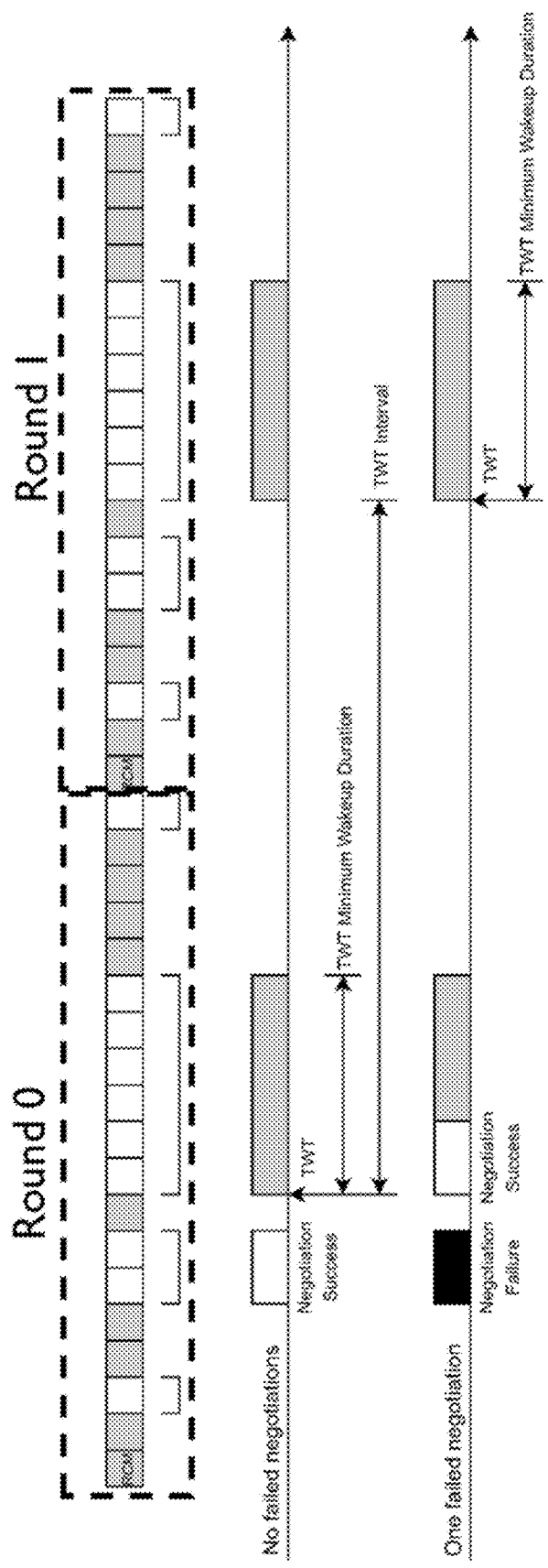
FIG. 10 illustrates an example ranging timeline in which the TWT parameters are renegotiated due to a negotiation failure according to embodiments of the present disclosure.

FIGS. 9A and 9B illustrate details of another example process 900 for promoting in-device coexistence between Wi-Fi and UWB communication in the time domain according to embodiments of the present disclosure. In some embodiments, the process 900 is a more detailed version of the process 800 of FIG. 8, and the process 900 includes multiple operations that are the same as (or similar to) corresponding operations of the process 800. For ease of explanation, the process 900 will be described as being performed by the coordinator 702 using the framework 700. The embodiment of the process 900 shown in FIGS. 9A and 9B is for illustration only. Other embodiments of the process 900 could be used without departing from the scope of this disclosure.

As shown in FIGS. 9A and 9B, the process 900 is performed in rounds, which are designated by the index i. At operation 901, the coordinator 702 obtains relevant information from the ranging application. For example, the coordinator 702 can read other IEs 712 (if needed) and couple the information therein with OOB information 714 to determine the location of potential ranging slots marked for ranging initiation messages, ranging response messages, ranging final messages, measurement report messages, and the like. As previously noted, a preliminary "negotiation" phase precedes ranging, where the controller determines the ranging parameters that work with all participants. These parameters may be sent out again in-band through the RCM or other control messages.

At operation 903, the coordinator 702 reads the RCM of the first ranging slot of the first ranging round of the first ranging block, in order to extract one or more IEs 712. For example, the coordinator 702 can obtain the first ARC IE 712 and read the Ranging Block Duration, Ranging Round Duration, and Ranging Slot Duration fields of the ARC IE ($N_{RB}$, $N_{RR}$ and $N_{RS}$) to determine the block structure. The coordinator 702 can also read the Deferred Mode field of the ARC IE 712 to determine whether a dedicated MRP exists in the ranging round after the ranging cycle completes. This information can be used in conjunction with other information to mark out ranging slots that can be used for ranging and measurement reporting.

The coordinator 702 can also read the Ranging Round Usage field of the ARC IE 712 to determine the time-based technique used for ranging (e.g., single-sided two-way ranging) and determine the number of ranging messages to be sent out by every initiator and responder. The coordinator 702 can also read the Schedule Mode field of the ARC IE 712 to determine whether schedule-based ranging or contention-based ranging is used. In schedule-based ranging, RDEVs are assigned ranging slots where they can access the channel to range or communicate ranging information. In contention-based ranging, RDEVs are given a range of ranging slots where they can contend for the channel to range or communicate ranging information. Any or all of this information can be used in conjunction with other information to mark out ranging slots that will be used for ranging and measurement reporting.

In addition to the obtaining the ARC IE, the coordinator 702 can also obtain the RDM IE 712 and determines the role of every participating device, i.e., initiator or responder. If schedule-based ranging is used by the controller, the coordinator 702 also determines every ranging slot that is assigned to every initiator or responder. If contention-based ranging is used by the controller, the coordinator 702 also obtains the RCPS IE 712 and determines the start/stop ranging slot delimiters of different contention phases that the controller allocates for initiators to range, responders to range, and responders to report measurements.

At operation 905, the coordinator 702 accounts for all active slots (e.g., the active slots 501) in the current ranging round. If this device is a responder, then the active slots are the slots in which, in chronological order, the RCM is sent out by the controller, a ranging initiation message is sent out by an initiator, a ranging response message is sent out by the ranging device in consideration, a ranging final message is sent out by an initiator (when valid), a measurement report message is sent out by the ranging device in question (when valid), and the RCUM is sent out by the controller (when available). Alternatively, if the device is an initiator, then the active slots are the slots where, in chronological order, the RCM is sent out by the controller, a ranging initiation message is sent by itself, a ranging response message is sent by a responder, a ranging final message is sent by itself, a measurement report message is sent by a responder (when valid), and the RCUM is sent out by the controller (when available). Alternatively, if the device is neither an initiator nor a responder, but rather an eavesdropper, then the active slots are the slots in which, in chronological order, the RCM is sent out by the controller, a ranging initiation message is sent out by an initiator, a ranging response is sent out by a responder, a ranging final message is sent out by an initiator (when valid), a measurement report message is sent by a responder (when valid), and the RCUM is sent out by the controller (when available).

The coordinator 702 also deduces inactive slots (e.g., the inactive slots 502) as all ranging slots in the ranging round obtained by extracting out the active slots. The coordinator 702 then examines the pattern of inactive slots in the ranging round and determines the location and duration of one or more silent periods $\{S_{i,k}\}$. In some embodiments, the coordinator 702 computes the duration of every silent period $S_{i,k}$ according to the following:

$$S_{i,k} = N_{S,k} \cdot T_{RSTU},$$

where $N_{s,k}$ is the number of ranging slots in the silent period k in the ranging round i and $T_{RTSU}$ is the duration of the Ranging Time Slot Unit (RSTU), which is defined by the 802.15.4z standard as 833.33 ns for the high-rate physical layer and 1 µs for the low-rate physical layer.

The coordinator 702 also determines $N_{VRR}$, which is the RCM Validity Rounds field of the ARC IE. The value of $N_{VRR}$ defines the number of consecutive ranging rounds controlled by the RCM. When $N_{VRR} > 1$, the arrangement of silent periods $\{S_{i,k}\}$ in each of the ranging rounds 0 . . . $N_{VRR} - 1$ is identical. In contrast, when $N_{VRR} = 1$, the silent periods $\{S_{i,k}\}$ in each of the ranging rounds may have a unique arrangement.

At operation 907, the coordinator 702 selects, from the group of silent periods $\{S_{i,k}\}$, a target silent period $S_i^*$ during which WLAN can operate. The target silent period $S_i^*$ needs to be sufficiently long to allow the STA to wake up at the beginning of the target silent period and go back to sleep at the end of the target silent period. In some embodiments, there are multiple other criteria for making this selection. The coordinator 702 can select the longest of the silent periods $\{S_{i,k}\}$ to maximize the WLAN wakeup duration. Alternatively, the coordinator 702 can select the second longest silent period to ensure that the STA has sufficient time to negotiate the TWT parameters with the AP. As an alternative, the coordinator 702 can choose a particular silent period that has a better match with the traffic pattern, assuming that the silent period is long enough to accommodate the traffic, and assuming that there is sufficient time for TWT parameter negotiation. The coordinator 702 can identify traffic patterns by collecting statistics on packet inter-arrival times and burst periods, for example. Alternatively, the coordinator 702 can request such information from a logically independent entity whose purpose is detecting traffic patterns for a particular app (e.g., the foreground app) or for a superposition of traffic for the most actively used apps by the user.

At operation 909, the coordinator 702 determines one or more TWT parameters so that the TWT SP overlaps with the target silent period $S_i^*$ (i.e., the WLAN wakes up at the start of the target silent period and remains awake for its duration). In some embodiments, the coordinator 702 determines the Target Wake Time 603, the TWT interval 604, the TWT Minimum Wake Duration 605, or any combination of these. The coordinator 702 determines the TWT parameters so that WLAN wakes up at the start of $S_i^*$ (set by the Target Wake Time 603), stays awake for the duration of $S_i^*$ (set by the TWT Minimum Wake Duration 605), and then wakes up again at the start of $S_i^*$ in the subsequent ranging round (set by the TWT Interval 604). In some embodiments, the coordinator 702 determines the TWT parameters according to the following:

Target Wake Time 603: The coordinator 702 first obtains the timestamp corresponding to the start of the ranging event. The coordinator 702 keeps track of the elapsed time since the start of the ranging event. The coordinator 702 computes the duration of the current ranging round as the product of the number of ranging slots in the round multiplied by $T_{RTSU}$, the duration of one ranging slot. The coordinator 702 then counts the number of ranging slots from the beginning of the ranging round to $S_i^*$, multiplies that number by $T_{RTSU}$, and adds that to the elapsed time. The resulting sum is translated to the time frame of reference of the WLAN STA; this becomes the value of the Target Wake Time 603.

TWT Interval 604: If $N_{VRR}>1$, then the ranging timeline of the next ranging round is identical to the timeline of the current round. Additionally, $S_{i+1}^*$ of the next ranging round has the same offset as $S_i^*$ of the current round. Accordingly, the coordinator 702 counts the number of ranging slots between the end of $S_i^*$ of the current round and $S_{i+1}^*$ of the next ranging round and multiplies that by $T_{RTSU}$; this becomes the value of the TWT Interval 604. As described in greater detail below, if $N_{VRR}=1$, then the ranging timeline of the next round is different than the timeline of the current round. The coordinator 702 has to wait until the very end of the current ranging round (to read the RCUM), or until the start of the next ranging round (to read the RCM), to determine $S_{i+1}^*$ for the next round and negotiate new parameters. Therefore, any TWT Interval 604 that the coordinator 702 determines will have to be renegotiated as early as the end of the current round, so the value of the TWT Interval 604 when $N_{VRR}=1$ can be arbitrary.

TWT Minimum Wake Duration 605: The value of this parameter should not exceed the duration of $S_i^*$. The coordinator 702 computes the duration of $S_i^*$ and applies a backoff.

Having determined the TWT parameters, the coordinator 702 feeds the WLAN module of the STA these parameters and requests that the WLAN module negotiate the parameters with the AP in the earliest silent period. To enable the negotiation, a Minimum Negotiation Duration (MND) is predefined to determine what silent periods qualify for negotiation. The MND takes into account the time it takes the WLAN STA to wake up from and then go back to sleep, and the time it takes to negotiate with the AP. The wakeup time is bounded and specific to the WLAN chipset, and it is in the range of tens of microseconds. The negotiation time, however, depends on the level of network congestion and can range from a few hundreds of microseconds to a few milliseconds. Accordingly, the coordinator 702 can either assume a worst-case congestion, prompt user input, or infer the level of congestion by communicating with other logically-independent entities running on the device tasked with inferring network congestion information.

Starting at operation 911, the STA attempts negotiation in the group of silent periods $\{S_{i,k}\}$, starting with the earliest silent period. At operation 911, the STA determines if the current silent period $S_{i,k}$ is longer than the MND. If the current silent period $S_{i,k}$ is not longer than the MND, then the STA moves to the next silent period in the series $S_{i,k+1}$ and performs operation 911 again. Alternatively, if the current silent period $S_{i,k}$ is longer than the MND, then the process 900 moves to operation 913.

At operation 913, the STA determines if the current silent period $S_{i,k}$ is not equal to the target silent period $S_i^*$. If $S_{i,k} \neq S_i^*$, then in operation 915, the STA negotiates the TWT parameters with the AP inside the silent period $S_{i,k}$ for SP in round i. If it is determined in operation 917 that negotiation is successful, then SP can occur. Alternatively, if it is determined in operation 917 that negotiation is not successful, then the STA moves to the next silent period in the series $S_{i,k+1}$ and performs operation 911 again.

Turning again to operation 913, if the STA determines that the current silent period $S_{i,k}$ is equal to the target silent period $S_i^*$, this means that negotiation is to take place in the target silent period where the SP is supposed to happen, thus SP will not occur in the current ranging period. At operation 919, the STA examines the value of $N_{VRR}$ to determine if the silent periods of the next ranging round (i+1) are identical to those of the current ranging round i. Specifically, it is determined in operation 919 if $N_{VRR}>1$. If $N_{VRR}>1$, then SP will occur in the next ranging round (i+1). At operation 921, the STA recomputes the TWT parameters so that the SP overlaps with the longest silent period in the next ranging period $S_{i+1}^*$, and at operation 923, the STA negotiates the TWT parameters with the AP inside the silent period $S_{i,k}$ for SP in the next round (i+1). The STA then stays awake for the silent period of the current ranging round (e.g., as seen in the second timeline in FIG. 10).

If $N_{VRR}=1$, then each ranging round can be characterized by different groups of active and inactive slots. Thus, the longest silent period in each subsequent ranging round may change from the previous round, which may require changing of the location and duration of the TWT SP. Accordingly, the coordinator 702 can renegotiate the TWT parameters by reading the RCM of the subsequent ranging round or the RCUM of the current ranging round to determine an appropriate SP for the subsequent ranging round.

Turning again to operation 919, if the STA determines that $N_{VRR}=1$, then the STA does not negotiate. In this case, at operation 925, the coordinator 702 reads the RCUM of the current round or the RCM of the next round to determine the SP, and the process 900 returns to operation 903 to attempt negotiation in the next ranging round (i+1).

Figure 11:
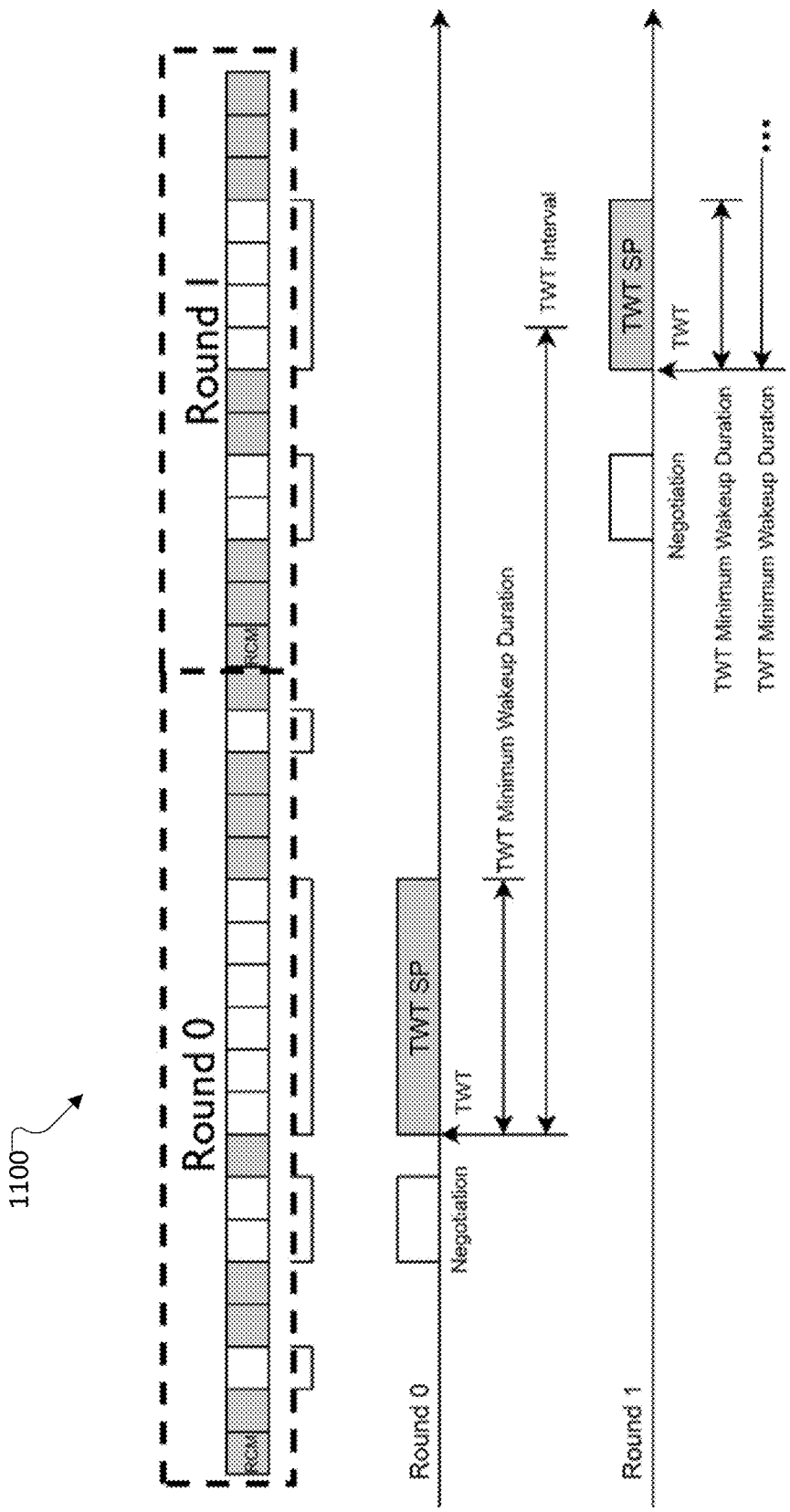
FIG. 11 illustrates an example ranging timeline in which the TWT parameters are renegotiated due to a changing ranging block structure according to embodiments of the present disclosure.

FIG. 11 illustrates an example ranging timeline 1100 in which the TWT parameters are renegotiated due to a changing ranging block structure according to embodiments of the present disclosure. As shown in FIG. 11, the pattern of active slots and inactive slots is different from Round 0 to Round 1. Thus, negotiation and TWT SP occur at different times in each round. During each round, the coordinator 702 can extract the RBU IE containing the updated durations of the ranging block, round and slot. Given the ranging timeline, the coordinator 702 determines the new TWT parameters 716 (namely, the Target Wake Time 603, the TWT Interval 604, and the TWT Minimum Wake Duration 605).

In subsequent cycles, the coordinator 702 reads the RR IE in the RCM or RCUM. The RR IE indicates if frames are transmitted at an offset from the starting edge of the ranging slot. The coordinator 702 uses this information to adjust the starting point of the TWT SP and its duration. The RR IE also indicates if round hopping is used where the controller hops to a different round, i.e., moves the ranging cycle from ranging round i in ranging block n to round j in block n+1, i≠j. The coordinator 702 obtains the hopping schedule through OOB means.

Although FIGS. 9A and 9B illustrate one example of a process 900 for promoting in-device coexistence between Wi-Fi and UWB communication in the time domain, various changes may be made to FIGS. 9A and 9B. For example, while shown as a series of steps, various steps in FIGS. 9A and 9B could overlap, occur in parallel, occur in a different order, or occur any number of times.

Figure 12:
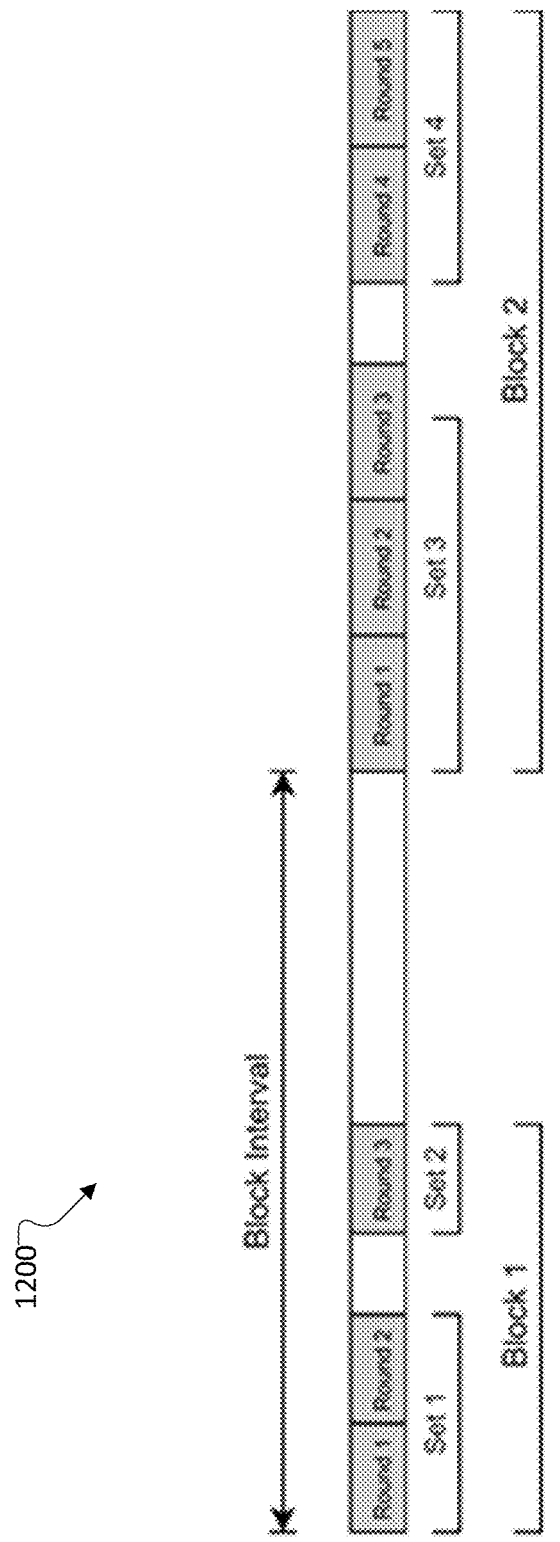
FIG. 12 illustrates an example ranging timeline using an interval-based mode of ranging according to embodiments of the present disclosure.

FIG. 12 illustrates an example ranging timeline 1200 using an interval-based mode of ranging according to embodiments of the present disclosure. The embodiment of the ranging timeline 1200 shown in FIG. 12 is for illustration only. Other embodiments of the ranging timeline 1200 could be used without departing from the scope of this disclosure.

The interval-based mode of ranging, an alternative to block-based ranging mode, enables a coarser level of coexistence between WLAN and UWB than the finer, ranging-slot-level coexistence enabled by block-based mode. As shown in FIG. 12, the interval-based mode enables a time structure where ranging blocks can be dynamically spaced out in time. In block-based mode, ranging blocks contain ranging rounds back-to-back. In interval-based mode, however, ranging rounds can be as sparse or as packed as the controller chooses. Ranging rounds are sent back-to-back in ranging round sets, but these sets can be spaced out within a ranging block. This structure is defined by the Ranging Interval Update IE (RIU) in addition to the ARC IE. The RIU IE is send out by the controller in the RCM (sent out at the very beginning of a ranging round), the RCUM (sent out at the very end of a round), and the Ranging Interval Update Message (RIUM) which is sent out with predefined intervals.

As in the block-based mode, the coordinator (e.g., the coordinator 702) can coordinate the activity of WLAN and UWB by devising a sleep-wake schedule for the WLAN STA using TWT. Unlike the block-based mode, the coordinator can set the TWT session period to occur in the gaps of inactivity between ranging round sets within a ranging block or between blocks. The algorithm is as follows. The coordinator continually reads the RCM, RCUM, and RIUM to extract the RIU IE and ARC IE and determine the ranging timeline as far into the future as it can. The coordinator then determines all silent periods, redefined as gaps between ranging round sets, and then determines the TWT parameters so that the TWT session period overlaps with the longest silent period. The coordinator then requests WLAN to negotiate the TWT parameters with the AP during earlier silent periods.

The algorithm to be used in the interval-based mode is similar to that to be used in the block-based mode, with the key difference being the definition of silent periods. While a silent period in block-based mode is defined as a group of contiguous ranging slots within a ranging round, it is defined as a gap between subsequent ranging round sets in interval-based mode.

Multiple TWT Session Periods in a Single Ranging Round

The embodiments described above detail how the coordinator can enable a TWT SP in the middle of a ranging round. An alternative to a single SP is multiple SPs within the same ranging round. The previously described processes can be modified accordingly. For example, the coordinator can select a set of suitable silent periods, each of which can overlap with or fully encompass a TWT SP. In addition to the previous criteria for making such a selection, there needs to be sufficient time in the silent periods leading up to every SP for TWT parameter negotiation. Multiple scenarios are possible, as follows:

If the suitable silent periods meet the original criteria and furthermore exhibit a periodic pattern within the ranging round (i.e., if the silent periods are separated by fixed number of UWB active slots), then a single negotiation is sufficient and is attempted in the silent periods leading up to the first SP.

If the suitable silent periods meet the original criteria and furthermore exhibit an almost period pattern within the ranging round (i.e., if some of the inactive slots of the longer silent periods can be excluded in its matching SP to ensure a periodic pattern among the SPs), then a single negotiation is sufficient and is attempted in the silent periods leading up to the first SP.

If there is neither an existing periodic pattern nor an artificial one, then multiple TWT parameter negotiations are needed.

Figure 13:
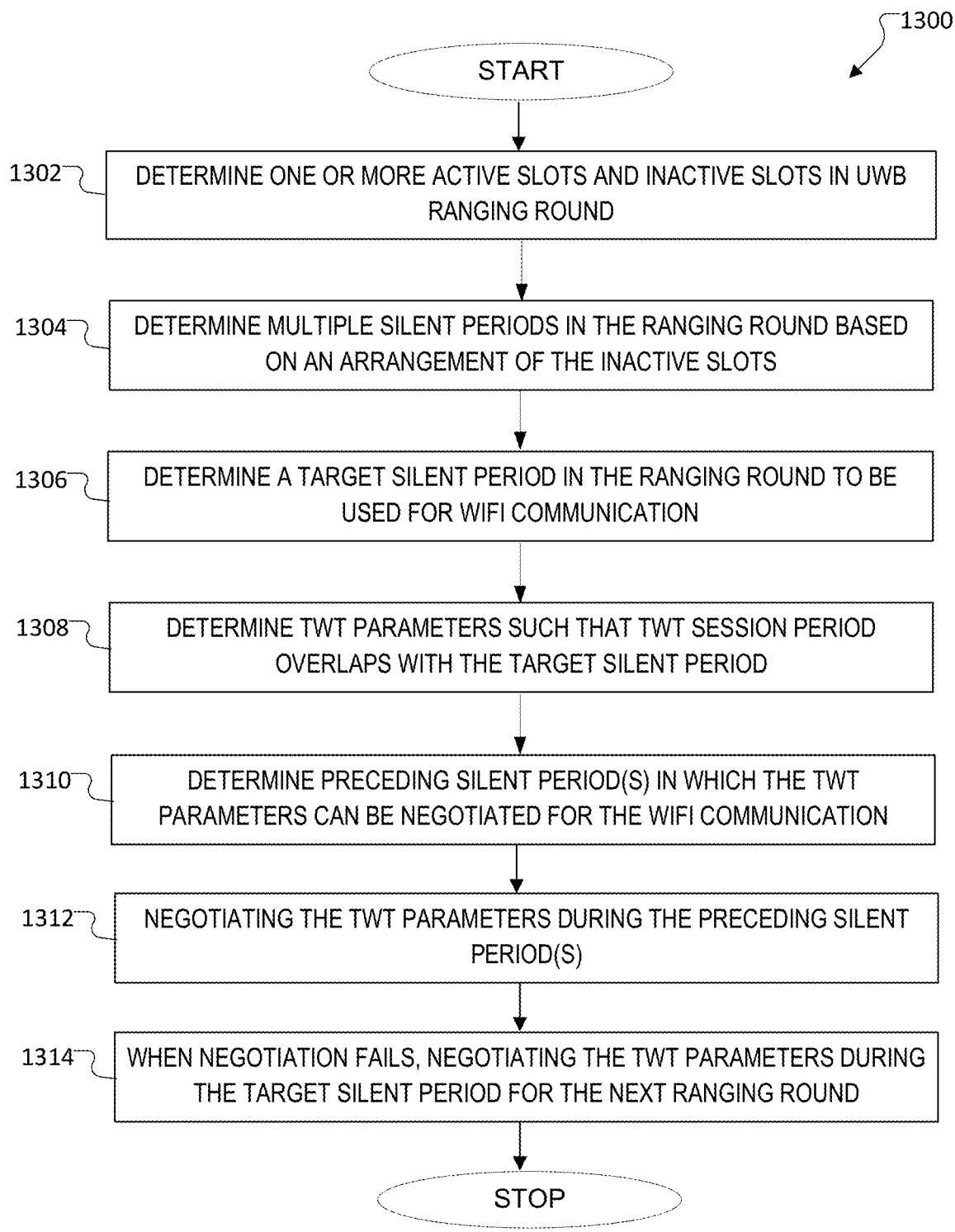
FIG. 13 illustrates a flow chart of a method for promoting in-device coexistence between Wi-Fi and UWB communication in the time domain according to embodiments of the present disclosure.

FIG. 13 illustrates a flow chart of a method 1300 for promoting in-device coexistence between Wi-Fi and UWB communication in the time domain according to embodiments of the present disclosure, as may be performed by a STA executing a coordinator (e.g., the coordinator 702 as illustrated in FIG. 7). The embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, the method 1300 begins at step 1302. At step 1302, a STA determines one or more active slots and inactive slots in a UWB ranging round. This could include, for example, the STA 111 executing the coordinator 702 to determine one or more active slots 501 and inactive slots 502 in an UWB ranging round 500, such as described in operation 803 and operation 905.

At step 1304, the STA determines multiple silent periods in the ranging round based on an arrangement of the inactive slots. This could include, for example, the STA 111 determining multiple silent periods 503 in the UWB ranging round 500 based on the arrangement of the inactive slots 502, such as described in operation 803 and operation 905.

At step 1306, the STA determines a target silent period in the ranging round, among the multiple silent periods, to be used for WiFi communication. This could include, for example, the STA 111 determining a target silent period $S_i^*$ in the ranging round 502, such as described in operation 805 and operation 907.

At step 1308, the STA determines multiple TWT parameters such that a TWT session period defined by the TWT parameters overlaps with the target silent period. This could include, for example, the STA 111 determining the Target Wake Time 603, the TWT interval 604, the TWT Minimum Wake Duration 605, or any combination of these, such as described in operation 805 and operation 909.

At step 1310, the STA determines one or more second silent periods preceding the target silent period in which the TWT parameters can be negotiated with an AP for the WiFi communication. This could include, for example, the STA 111 determining one or more second silent periods $S_{i,k}$ preceding the target silent period $S_i^*$ for negotiation, such as described in operation 807 and operations 911 and 913.

At step 1312, the STA negotiates the TWT parameters with the AP during the one or more second silent periods. This could include, for example, the STA 111 negotiating the TWT parameters during the one or more second silent periods $S_{i,k}$, such as described in operation 807 and operation 915.

At step 1314, in response to negotiation of the TWT parameters with the AP failing during the one or more second silent periods, the STA negotiates the TWT parameters with the AP during the target silent period so that the TWT session period occurs in a next UWB ranging round. This could include, for example, the STA 111 negotiating the TWT parameters inside the target silent period $S_i^*$ so that TWT SP occurs in round i+1.

Although FIG. 13 illustrates one example of a method 1300 for promoting in-device coexistence between Wi-Fi and UWB communication in the time domain, various changes may be made to FIG. 13. For example, while shown as a series of steps, various steps in FIG. 13 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   determining one or more active slots and inactive slots in an ultra-wide band (UWB) ranging round;
   determining multiple silent periods in the ranging round based on an arrangement of the inactive slots by (i) determining multiple sets of contiguous inactive slots in the ranging round and (ii) grouping each set of contiguous inactive slots into one of the multiple silent periods;
   determining a target silent period in the ranging round, among the multiple silent periods, to be used for WiFi communication;
   determining multiple target wake time (TWT) parameters such that a TWT session period defined by the TWT parameters overlaps with the target silent period;
   determining one or more second silent periods preceding the target silent period in which the TWT parameters can be negotiated with an access point (AP) for the WiFi communication; and
   negotiating the TWT parameters with the AP during the one or more second silent periods.

2. The method of claim 1, wherein the one or more active slots and inactive slots are determined based on out-of-band (OOB) information and one or more information elements (IEs) within one or more UWB control messages of the ranging round.

3. The method of claim 2, wherein:
   the one or more UWB control messages of the ranging round comprise a ranging control message (RCM), and
   the one or more IEs comprise at least one of: an Advanced Ranging Control IE, a Ranging Contention Phase Structure IE, a Ranging Device Management IE, a Ranging Round IE, and a Ranging Block Update IE.

4. The method of claim 2, wherein the OOB information comprises at least one setup parameter negotiated between ranging participants.

5. The method of claim 1, wherein the multiple TWT parameters comprise a target wake time, a TWT interval, and a TWT minimum wake duration.

6. The method of claim 1, wherein determining the one or more second silent periods preceding the target silent period comprises:
   starting with an earliest silent period of the one or more second silent periods, comparing each of the one or more second silent periods to a predefined minimum negotiation duration; and
   selecting the earliest silent period that is longer than the predefined minimum negotiation duration.

7. The method of claim 1, further comprising:
   in response to negotiation of the TWT parameters with the AP failing during the one or more second silent periods, negotiating the TWT parameters with the AP during the target silent period so that the TWT session period occurs in a next UWB ranging round.

8. A device comprising:
   a memory configured to store instructions; and
   a processor operably connected to the memory, the processor configured, when executing the instructions, to:
   determine one or more active slots and inactive slots in an ultra-wide band (UWB) ranging round;
   determine multiple silent periods in the ranging round based on an arrangement of the inactive slots by (i) determining multiple sets of contiguous inactive slots in the ranging round and (ii) grouping each set of contiguous inactive slots into one of the multiple silent periods;
   determine a target silent period in the ranging round, among the multiple silent periods, to be used for WiFi communication;
   determine multiple target wake time (TWT) parameters such that a TWT session period defined by the TWT parameters overlaps with the target silent period;
   determine one or more second silent periods preceding the target silent period in which the TWT parameters can be negotiated with an access point (AP) for the WiFi communication; and
   negotiate the TWT parameters with the AP during the one or more second silent periods.

9. The device of claim 8, wherein the processor is configured to determine the one or more active slots and inactive slots based on out-of-band (OOB) information and one or more information elements (IEs) within one or more UWB control messages of the ranging round.

10. The device of claim 9, wherein:
    the one or more UWB control messages of the ranging round comprise a ranging control message (RCM), and
    the one or more IEs comprise at least one of an Advanced Ranging Control IE, a Ranging Contention Phase Structure IE, a Ranging Device Management IE, a Ranging Round IE, and a Ranging Block Update IE.

11. The device of claim 9, wherein the OOB information comprises at least one setup parameter negotiated between ranging participants.

12. The device of claim 8, wherein the multiple TWT parameters comprise a target wake time, a TWT interval, and a TWT minimum wake duration.

13. The device of claim 8, wherein to determine the one or more second silent periods preceding the target silent period, the processor is configured to:
    starting with an earliest silent period of the one or more second silent periods, compare each of the one or more second silent periods to a predefined minimum negotiation duration; and
    select the earliest silent period that is longer than the predefined minimum negotiation duration.

14. The device of claim 8, wherein the processor is further configured to:
    in response to negotiation of the TWT parameters with the AP failing during the one or more second silent periods, negotiate the TWT parameters with the AP during the target silent period so that the TWT session period occurs in a next UWB ranging round.

15. A non-transitory computer readable medium comprising a plurality of instructions that, when executed by at least one processor, is configured to cause the at least one processor to:
    determine one or more active slots and inactive slots in an ultra-wide band (UWB) ranging round;
    determine multiple silent periods in the ranging round based on an arrangement of the inactive slots by (i) determining multiple sets of contiguous inactive slots in the ranging round and (ii) grouping each set of contiguous inactive slots into one of the multiple silent periods;
    determine a target silent period in the ranging round, among the multiple silent periods, to be used for WiFi communication;
    determine multiple target wake time (TWT) parameters such that a TWT session period defined by the TWT parameters overlaps with the target silent period;
    determine one or more second silent periods preceding the target silent period in which the TWT parameters can be negotiated with an access point (AP) for the WiFi communication; and
    negotiate the TWT parameters with the AP during the one or more second silent periods.

16. The non-transitory computer readable medium of claim 15, wherein the plurality of instructions is configured to cause the at least one processor to determine the one or more active slots and inactive slots based on out-of-band (OOB) information and one or more information elements (IEs) within one or more UWB control messages of the ranging round.

17. The non-transitory computer readable medium of claim 16, wherein the OOB information comprises at least one setup parameter negotiated between ranging participants.

18. The non-transitory computer readable medium of claim 15, wherein the multiple TWT parameters comprise a target wake time, a TWT interval, and a TWT minimum wake duration.

19. The non-transitory computer readable medium of claim 15, wherein to determine the one or more second silent periods preceding the target silent period, the plurality of instructions is configured to cause the at least one processor to:
    starting with an earliest silent period of the one or more second silent periods, compare each of the one or more second silent periods to a predefined minimum negotiation duration; and
    select the earliest silent period that is longer than the predefined minimum negotiation duration.

20. The non-transitory computer readable medium of claim 15, wherein the plurality of instructions is further configured to cause the at least one processor to:
    in response to negotiation of the TWT parameters with the AP failing during the one or more second silent periods, negotiate the TWT parameters with the AP during the target silent period so that the TWT session period occurs in a next UWB ranging round.

* * * * *